(12) United States Patent
Kang et al.

(10) Patent No.: US 9,255,170 B2
(45) Date of Patent: Feb. 9, 2016

(54) BLOCK COPOLYMER, METHOD OF FORMING THE SAME, AND METHOD OF FORMING PATTERN

(71) Applicants: Samsung Display Co., Ltd., Yongin, Gyeonggi-Do (KR); KOREA UNIVERSITY RESEARCH AND BUSINESS FOUNDATION, Seoul (KR); Sogang University Research Foundation, Seoul (KR)

(72) Inventors: Min Hyuck Kang, Seoul (KR); Su Mi Lee, Hwaseong-si (KR); Myung Im Kim, Suwon-si (KR); Tae Woo Kim, Seoul (KR); Seung-Won Park, Seoul (KR); Xie Lei, Suwon-si (KR); Na Na Kang, Seoul (KR); Bong-Jin Moon, Seoul (KR); Joona Bang, Seoul (KR); Sang Hoon Woo, Seoul (KR); Jin Yeong Lee, Anyang-si (KR); Hyun Jung Jung, Seoul (KR); June Huh, Seoul (KR)

(73) Assignees: SAMSUNG DISPLAY CO., LTD. (KR); KOREA UNIVERSITY RESEARCH AND BUSINESS FOUNDATION (KR); SOGANG UNIVERSITY RESEARCH FOUNDATION (KR)

(*) Notice: Subject to any disclaimer, the term of this patent is extended or adjusted under 35 U.S.C. 154(b) by 159 days.

(21) Appl. No.: 14/086,182

(22) Filed: Nov. 21, 2013

(65) Prior Publication Data
US 2014/0197132 A1 Jul. 17, 2014

(30) Foreign Application Priority Data
Jan. 11, 2013 (KR) ........................ 10-2013-0003439

(51) Int. Cl.
| | | |
|---|---|---|
| *C08F 279/02* | (2006.01) | |
| *C08F 277/00* | (2006.01) | |
| *C08F 293/00* | (2006.01) | |
| *C08G 61/08* | (2006.01) | |
| *C08F 279/00* | (2006.01) | |
| *C08G 63/00* | (2006.01) | |
| *C08F 32/06* | (2006.01) | |

(52) U.S. Cl.
CPC .............. *C08F 293/00* (2013.01); *C08G 61/08* (2013.01); *C08G 2261/1424* (2013.01); *C08G 2261/1426* (2013.01); *C08G 2261/3324* (2013.01); *C08G 2261/418* (2013.01); *C08G 2261/74* (2013.01)

(58) Field of Classification Search
CPC .............................. C08G 63/00; C08F 279/02
USPC .............. 525/94, 88, 267, 290, 269; 427/461, 427/467; 216/48, 49
See application file for complete search history.

(56) References Cited

U.S. PATENT DOCUMENTS

| | | |
|---|---|---|
| 5,939,504 A | 8/1999 | Woodson, Jr. et al. |
| 6,310,121 B1 | 10/2001 | Woodson, Jr. et al. |
| 6,881,819 B2 | 4/2005 | Schmid et al. |
| 7,767,265 B2 | 8/2010 | Yoshida et al. |
| 8,133,341 B2 | 3/2012 | Nealey et al. |
| 8,173,347 B2 | 5/2012 | Koberstein et al. |
| 8,193,285 B2 | 6/2012 | Takahashi et al. |
| 2008/0045664 A1 | 2/2008 | Sone et al. |
| 2010/0149470 A1 | 6/2010 | Hino et al. |
| 2010/0298514 A1 | 11/2010 | Willis et al. |
| 2011/0281197 A1 | 11/2011 | Daikoku et al. |
| 2012/0046484 A1 | 2/2012 | Iyer et al. |
| 2012/0080404 A1 | 4/2012 | Lee et al. |
| 2012/0196996 A1 | 8/2012 | Moctezuma Espiricueto et al. |

FOREIGN PATENT DOCUMENTS

| | | |
|---|---|---|
| EP | 2351785 A1 | 8/2011 |
| JP | 05-194749 A | 8/1993 |
| JP | 05-287030 A | 11/1993 |
| JP | 06-040176 A | 2/1994 |
| JP | 2004-506787 A | 3/2004 |
| JP | 2005-033505 A | 2/2005 |
| JP | 2006-327853 A | 12/2006 |
| JP | 2007-189604 A | 7/2007 |
| JP | 4132265 | 6/2008 |
| JP | 4725469 | 4/2011 |
| JP | 2011-114589 A | 6/2011 |
| JP | 2011-152410 A | 8/2011 |
| KR | 1020010032618 A | 4/2001 |
| KR | 1020040021093 A | 3/2004 |
| KR | 100510355 | 8/2005 |
| KR | 100573729 | 4/2006 |
| KR | 1020080072746 A | 8/2008 |
| KR | 100863188 B1 | 10/2008 |
| KR | 100927115 | 11/2009 |
| KR | 102010005841 A | 1/2010 |
| KR | 101005300 | 12/2010 |
| KR | 1020110101131 A | 9/2011 |
| KR | 101146530 | 5/2012 |

| KR | 101148208 | | 5/2012 |
| KR | 101159024 | B1 | 6/2012 |
| KR | 1020120081791 | A | 7/2012 |
| KR | 1020130016976 | A | 2/2013 |
| KR | 101293558 | B1 | 7/2013 |
| WO | 0216449 | A2 | 2/2002 |
| WO | 2005030776 | A1 | 4/2005 |

OTHER PUBLICATIONS

Bolton et al., "Tandem RAFT-ATRP Synthesis of Polystyrene-Poly(Methyl Methacrylate) Bottlebrush Block Copolymers and Their Self-Assembly into Cylindrical Nanostructures", ACS Macro Letter, vol. 1, 2012, pp. 15-18.
Han et al., "Controlled evaporative self-assembly of hierarchically structured bottlebrush block copolymer with nanochannels", J. Mater. Chem., vol. 21, 2011, pp. 14248-14253.
Hodrokoukes, et al., "Microphase Separation in Normal and Inverse Tapered Block Copolymers of Polystyrene and Polyisoprene. 1. Phase State", Macromolecules, vol. 34, 2001, pp. 650-657.
Pakula et al, "Copolymers with controlled distribution of comonomers alogn the chain, 1, Structure, thermodynamics and dynamic properties of gradient copolymers. Computer simulation", Macromol. Theory Simul. vol. 5, 1996, pp. 987-1006.
Singh et al, "Manipulating ordering transitions in interfacially modified block copolymers", Soft Matter, vol. 5, 2009, pp. 4757-4762.
Sveinbjornsson et al., "Rapid self-assembly of brush block copolymers to photonic crystals", PNAS Early Edition, 2012, pp. 1-5.
Xia et al., "Efficient Synthesis of Narrowly Dispersed Brush Copolymers and Study of Their Assemblies: The Importance of Side Chain Arrangement", J.Am.Chem.Soc., vol. 131, 2009, pp. 18525-18532.
Zhao et al., "Polystyrene-Polylactide Bottlebrush Block Copolymer at the Air/Water Interface", Macromolecules, vol. 42, 2009, pp. 9027-9033.
Zielinski et al., "Thermodynamic Considerations of Triblock copolymers with a Random Middle Block", Macromolecules, vol. 25, 1992, pp. 5957-5964.
Hashimoto et al., "Structure and Properties of Tapered Block Polymers of Styrene and Isoprene II. Dynamic Mechanical Responses and Their Structural Interpretations", Polymer Journal, vol. 15, No. 10, 1983, pp. 699-711.
Tsukahara et al., "Structure and Properties of Tapered Block Polymers of Styrene and Isoprene", Polymer Journal, vol. 12, No. 7, 1980, pp. 455-456.

*Primary Examiner* — Duc Truong
(74) *Attorney, Agent, or Firm* — Cantor Colburn LLP

(57) ABSTRACT

A block copolymer is provided. The block copolymer according to an exemplary embodiment includes a first block represented by Chemical Formula 1 and a second block represented by Chemical Formula 2:

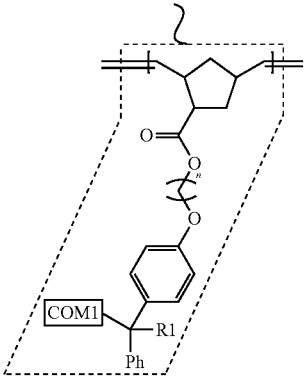

Chemical Formula 1

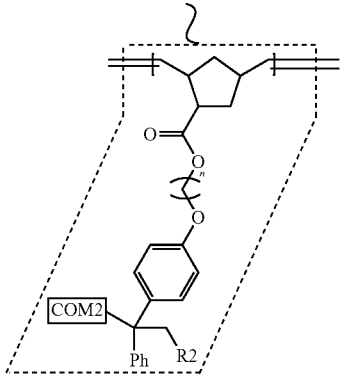

Chemical Formula 2 wherein COM1 and COM2 are independently selected from a polystyrene moiety, polymethylmethacrylate moiety, polyethylene oxide moiety, polyvinylpyridine moiety, polydimethylsiloxane moiety, polyferrocenyldimethylsilane moiety, and polyisoprene moiety, R1 is hydrogen or an alkyl group with 1 to 10 carbon atoms, Ph is a phenyl group, a is 1 to 50, R2 is hydrogen or an alkyl group with 1 to 10 carbon atoms, and b is 1 to 50.

14 Claims, 12 Drawing Sheets

BLOCK COPOLYMER, METHOD OF FORMING THE SAME, AND METHOD OF FORMING PATTERN

This application claims priority to Korean Patent Application No. 10-2013-0003439, filed on Jan. 11, 2013, and all the benefits accruing therefrom under 35 U.S.C. §119, the content of which in its entirety is herein incorporated by reference.

BACKGROUND (a) Technical Field

The present disclosure relates to a block copolymer, a method of forming the same, and a method of forming a pattern.

(b) Description of the Related Art

Recently, there has been interest in the scientific community to develop methods to form a pattern having a minute line width using a block copolymer. The pattern formation method controls molecular weight of the block copolymer to form a pattern of various sizes, and controls a molecular weight ratio of the blocks in the block copolymer to form a pattern of various shapes.

A block copolymer is a polymer comprising two or more polymer blocks connected to each other through a covalent bond. In a diblock copolymer, which is the simplest structure of a block copolymer, two polymer blocks having different properties are connected to each other to form one polymer. The two polymer blocks that are connected to each other may be easily phase-separated due to different material properties, and the block copolymer may be finally self-assembled to form a nanostructure. In a linear block copolymer, phase-separation and self-assembly within a short process time can provide a pattern having a size of several tens of nanometers, however it is difficult to provide a pattern having a period of more than 100 nm from a self-assembly process because the phase-separation time is long.

The above information disclosed in this Background section is only for enhancement of understanding of the background of the invention and therefore it may contain information that does not form the prior art that is already known in this country to a person of ordinary skill in the art.

SUMMARY

The present disclosure provides a block copolymer, a method of making the block copolymer, and a pattern formation method having an increased phase-separation speed achieved by minimizing entanglement between polymers.

A block copolymer according to an exemplary embodiment of the present disclosure includes a first block represented by Chemical Formula 1 and a second block represented by Chemical Formula 2:

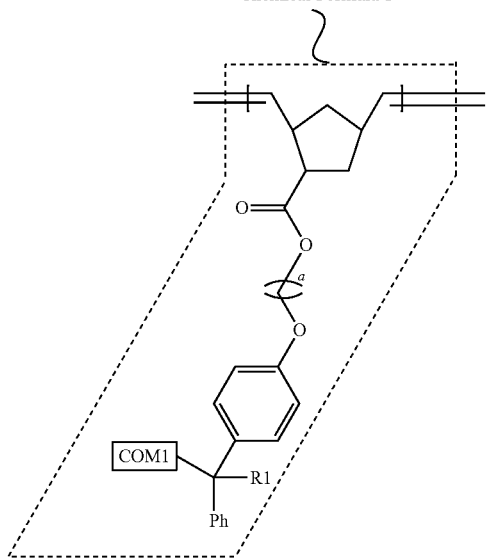

Chemical Formula 1

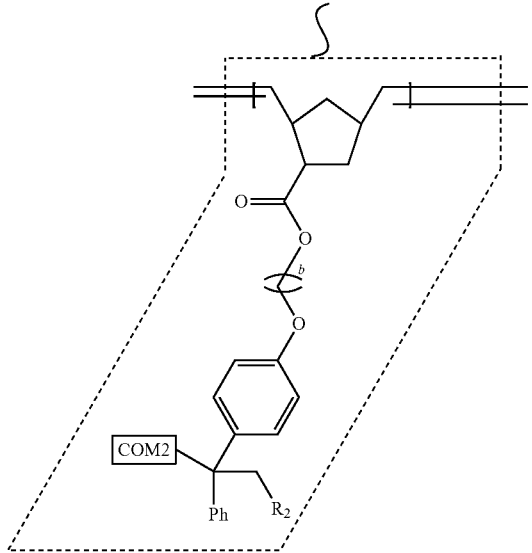

Chemical Formula 2 wherein COM1 and COM2 are independently selected from a polystyrene moiety, polymethylmethacrylate moiety, polyethylene oxide moiety, polyvinylpyridine moiety, polydimethylsiloxane moiety, polyferrocenyldimethylsilane moiety, and polyisoprene moiety, R1 is hydrogen or an alkyl group with 1 to 10 carbon atoms, Ph is a phenyl group, a is 1 to 50, R2 is hydrogen or an alkyl group with 1 to 10 carbon atoms, and b is 1 to 50.

The block copolymer may comprise a block represented by Chemical Formula BC comprising a first block represented by Chemical Formula 1 and a second block represented by Chemical Formula 2:

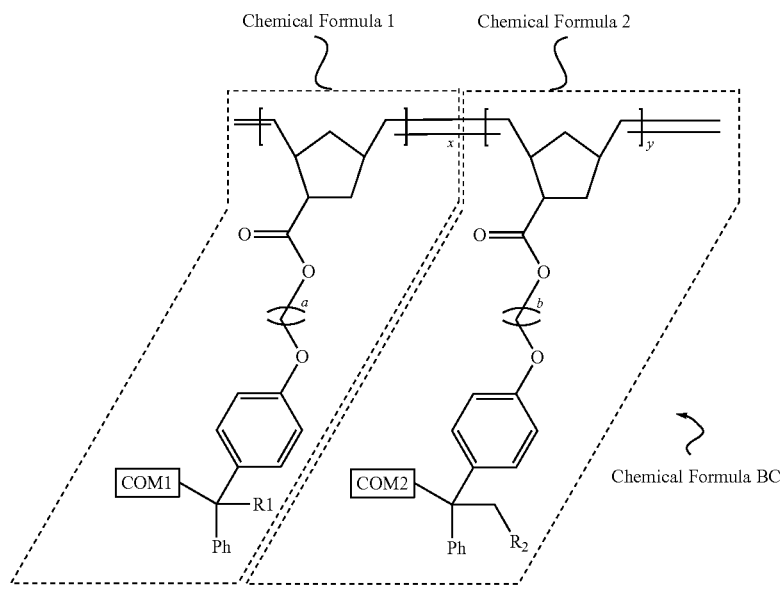

Chemical Formula BC wherein COM1 and COM2 are independently selected from a polystyrene moiety, polymethylmethacrylate moiety, polyethylene oxide moiety, polyvinylpyridine moiety, polydimethylsiloxane moiety, polyferrocenyldimethylsilane moiety, and polyisoprene moiety, R1 is hydrogen or an alkyl group with 1 to 10 carbon atoms, Ph is a phenyl group, x is 10 to 500, a is 1 to 50, R2 is hydrogen or an alkyl group with 1 to 10 carbon atoms, y is 10 to 500, and b is 1 to 50.

In Chemical Formula 1, COM1 may comprise a group represented by Chemical Formula 3, and in Chemical Formula 2, COM2 may comprise a group represented by Chemical Formula 4:

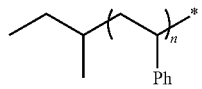

Chemical Formula 3

Chemical Formula 4 wherein Ph is a phenyl group and Me is methyl, n is 10 to 1000, m is 10 to 1000, and * means a point of attachment.

The block copolymer is represented by Chemical Formula 5:

Chemical Formula 5

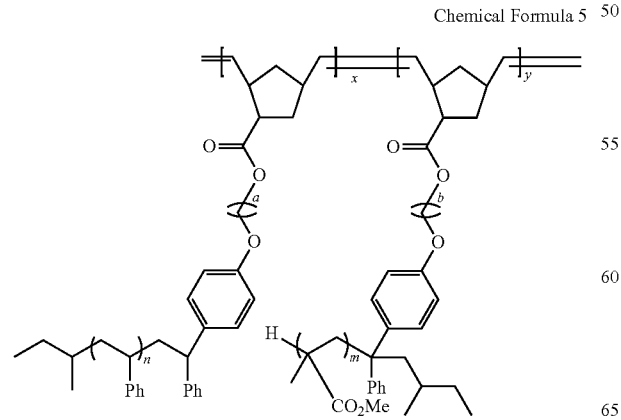

wherein Ph is a phenyl group, Me is methyl, x is 10 to 500, y is 10 to 500, n is 10 to 1000 and m is 10 to 1000.

The first block and the second block may be connected to each other randomly.

The block copolymer can be made, for example, by using a material represented by Chemical Formula 6

Chemical Formula 6

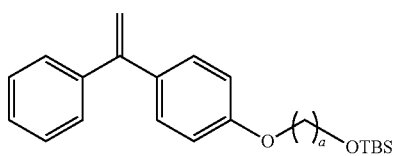

wherein OTBS is a tert-butyldimethylsilyloxy group.

The material of Chemical Formula 6 may be synthesized based on Reaction Equation 1:

Reaction Equation 1

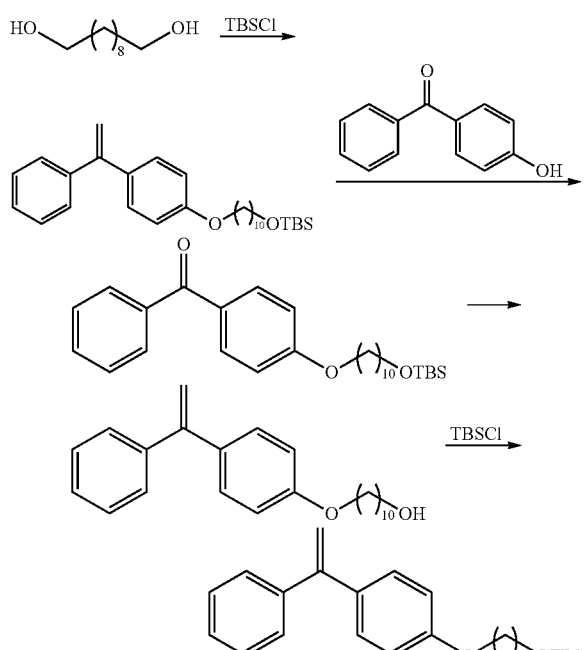

wherein TBSCl is tert-butyldimethylsilyl chloride, and OTBS is tert-butyldimethylsilyloxy group.

The block copolymer is made by polymerizing a first macromer represented by Chemical Formula 7 or Chemical Formula 7-1 and a second macromer represented by Chemical Formula 8 by a ring opening metathesis polymerization method:

Chemical Formula 7

Chemical Formula 7-1

Chemical Formula 8 wherein Ph is a phenyl group, Me is methyl, a is 1 to 10, n is 10 to 1000, b is 1 to 10, and m is 10 to 1000.

The first macromer represented by Chemical Formula 7 may be synthesized based on Reaction Equation 2:

Reaction Equation 2

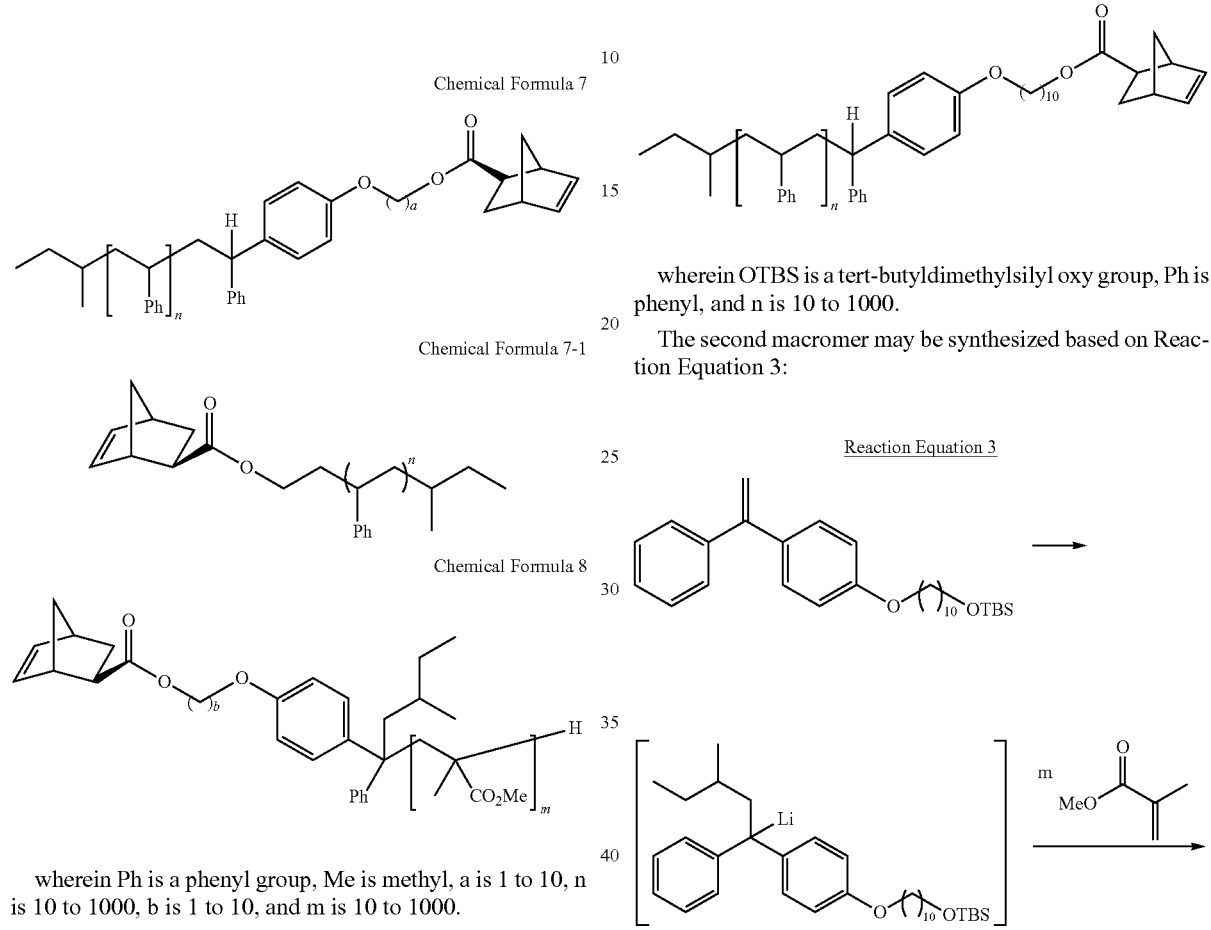

wherein OTBS is a tert-butyldimethylsilyl oxy group, Ph is phenyl, and n is 10 to 1000.

The second macromer may be synthesized based on Reaction Equation 3:

Reaction Equation 3

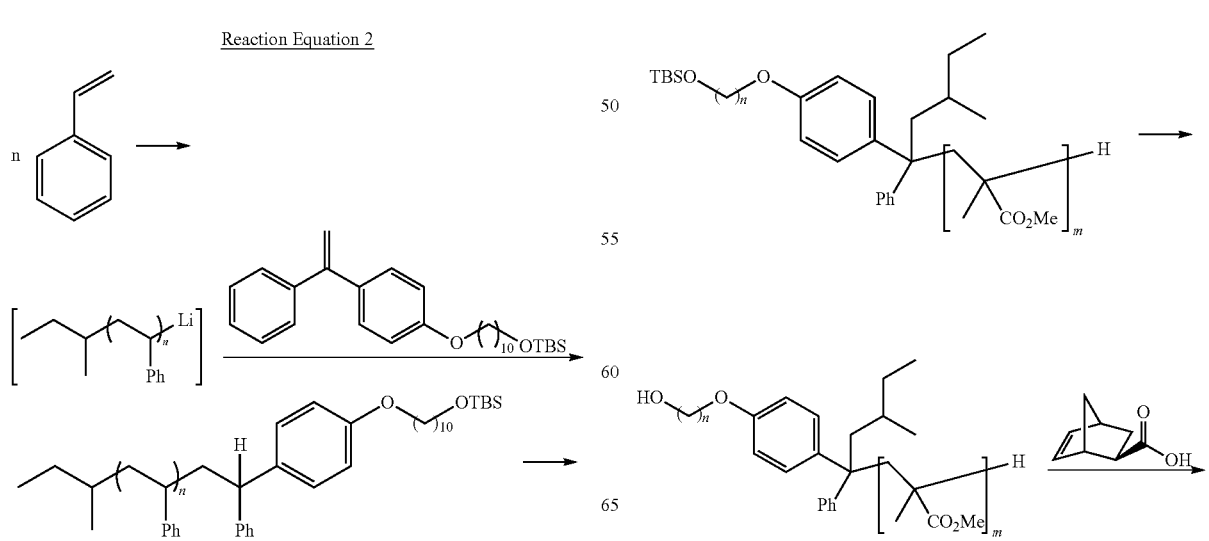

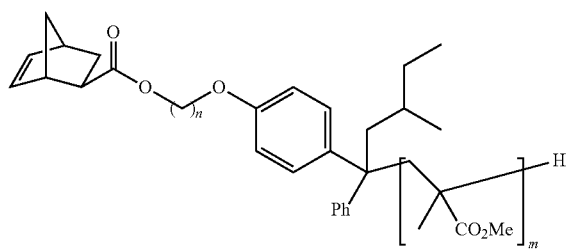

wherein Ph is phenyl, Me is methyl, OTBS is tert-butyldimethylsilyl oxy group, and m is 10 to 1000.

A Grubbs catalyst may be present during the polymerization of the first macromer and the second macromer.

The first macromer represented by Chemical Formula 7-1 may be synthesized based on Reaction Equation 4:

Reaction Equation 4

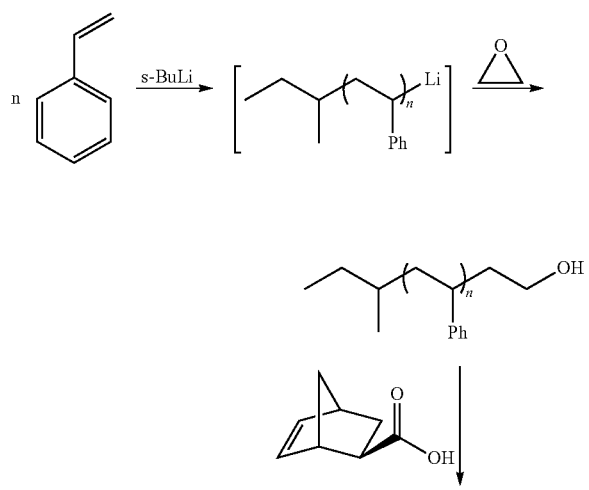

wherein Ph is phenyl, and n is 10 to 1000.

A pattern formation method according to an exemplary embodiment of the present disclosure includes: coating a block copolymer comprising a first block and a second block on a substrate comprising a mother pattern layer to form a polymer thin film; selectively removing one block of a first block and a second block from the polymer thin film; and etching the mother pattern layer by using the polymer thin film from which one block is removed as a mask.

The polymer thin film may be treated with ultraviolet rays or heat.

A block copolymer according to another exemplary embodiment of the present disclosure includes: a first block represented by COM A in Structural Formula A; a second block represented by COM B in Structural Formula A; and a random block inserted between the first block and the second block and represented by RBC in Structural Formula A:

Structural Formula A

In the Structural Formula A, COM A and COM B are independently selected from polystyrene, polymethylmethacrylate, polyethylene oxide, polyvinylpyridine, polydimethylsiloxane, polyferrocenyldimethylsilane, and polyisoprene, and RBC is a group in which at least two unit blocks are randomly copolymerized.

COM A may be a group comprising polystyrene, and COM B may be a group comprising polymethylmethacrylate.

The block copolymer may be represented by Chemical Formula B:

Chemical Formula B

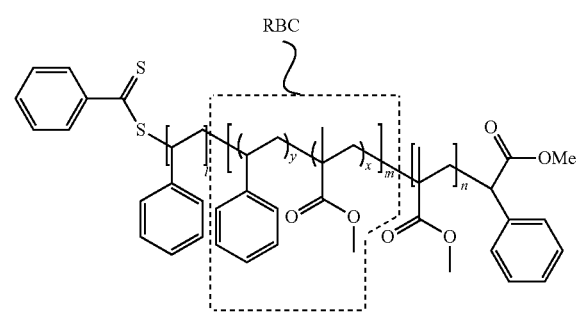

wherein a molecular weight of Chemical Formula B is 10,000 to 1,000,000, 1 and n are 10 to 10,000, m is 5 to 2000, x is 10 to 500, y is 10 to 500 and a unit block represented by

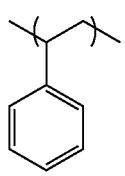

and a unit block represented by

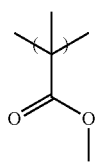

in RBC are randomly copolymerized.

The block copolymer can be synthesized, for example, based on Reaction Equation A.

Reaction Equation A

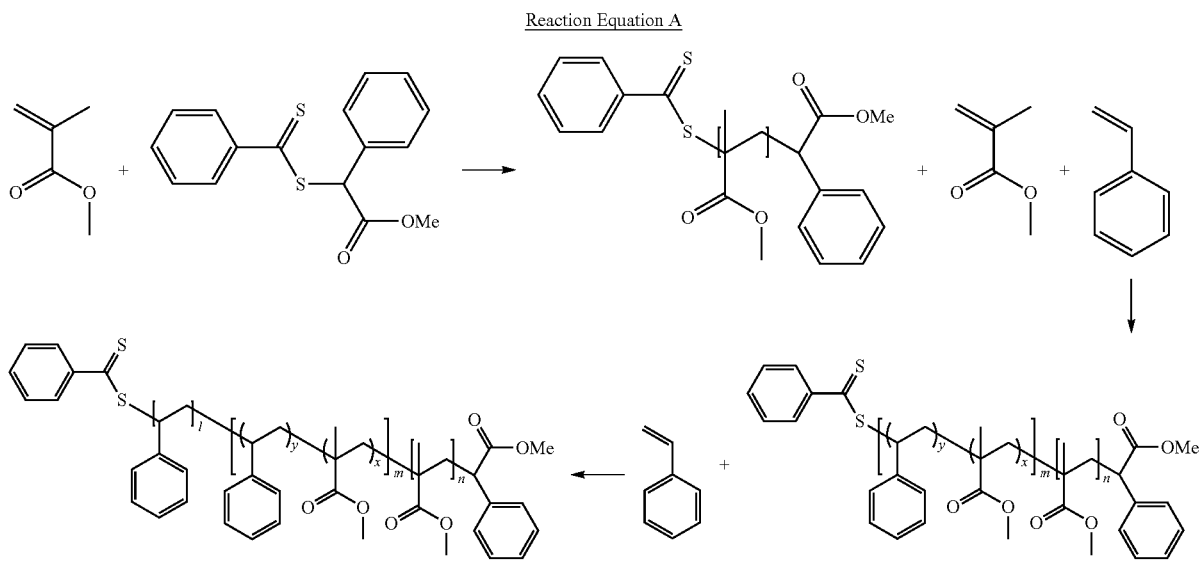

A pattern formation method according to an exemplary embodiment of the present disclosure includes: coating the block copolymer represented by Structural Formula A on a substrate including a mother pattern layer to form a polymer thin film; selectively removing one block of a first block and a second block from the polymer thin film; and etching the mother pattern layer by using the polymer thin film from which one block is removed as a mask.

The polymer thin film may be treated with ultraviolet rays or heat.

According to an exemplary embodiment of the present disclosure, by forming a bottle-brush type block copolymer described herein, the entanglement phenomenon of the polymer is minimized by the presence of side chains such that the phase separation speed is increased and the main chain is spread. Accordingly, process time to form a pattern by using such a block copolymer may be minimized.

BRIEF DESCRIPTION OF THE DRAWINGS

A description of the figures, which are meant to be exemplary and not limiting, is provided in which.

DETAILED DESCRIPTION OF THE EMBODIMENTS

Figure 1:
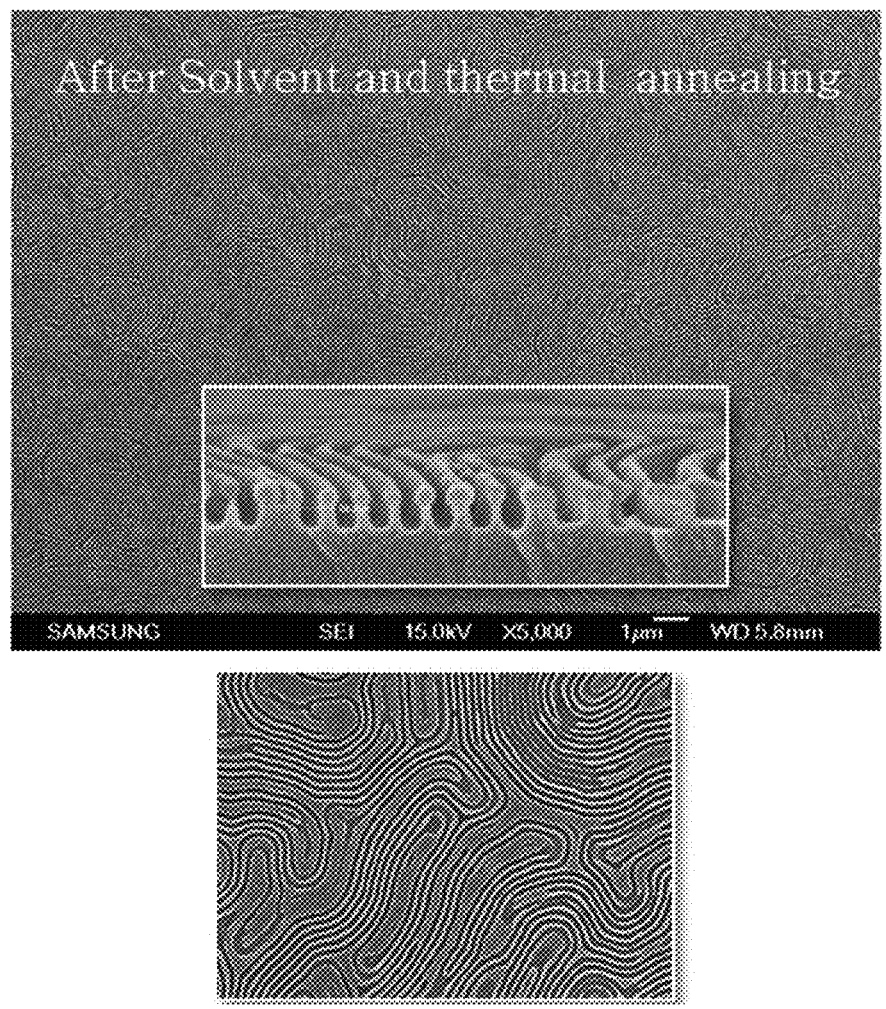
FIG. 1 and FIG. 2 are photos showing a phase-separation phenomenon of a vertical lamella structure of a bottle-brush type block copolymer comprising a first block represented by Formula 1 and a second represented by Formula 2.

The present disclosure will be described more fully hereinafter with reference to the accompanying drawings, in which exemplary embodiments are shown. However, it is to be understood that the disclosure is not limited to the disclosed embodiments, but, on the contrary, is intended to cover various modifications. As those skilled in the art would realize, the described embodiments may be modified in various different ways, all without departing from the spirit or scope of the present description.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Like reference numerals designate like elements throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items.

Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements-described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Reaction conditions and reagents shown in the reaction equations are illustrative and it is appreciated that other reaction conditions and reagents may be selected without undue experimentation.

A First Embodiment is a Bottle-Brush Type Block Copolymer as Further Described Below.

A block copolymer according to an exemplary embodiment of the present disclosure comprises a first block represented by Chemical Formula 1 and a second block represented by Chemical Formula 2.

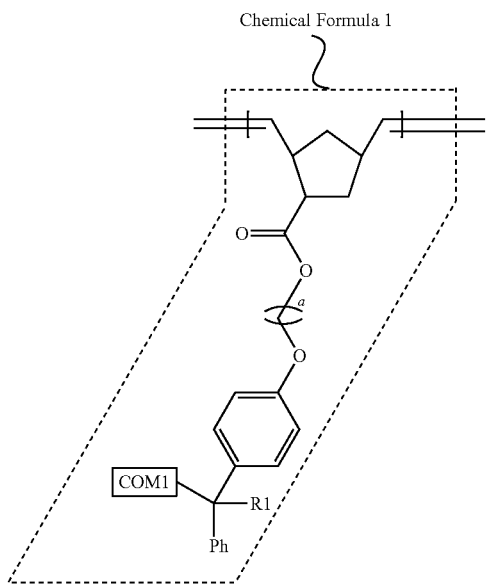

Chemical Formula 1

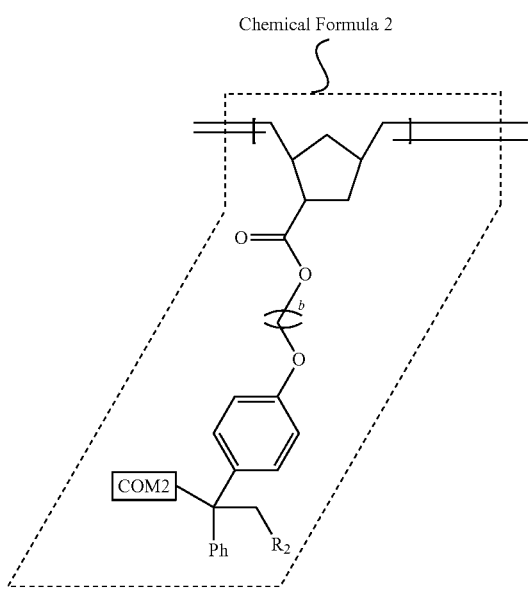

Chemical Formula 2

Here, COM1 and COM2 are independently selected from a polystyrene moiety, polymethylmethacrylate moiety, polyethylene oxide moiety, polyvinylpyridine moiety, polydimethylsiloxane moiety, polyferrocenyldimethylsilane moiety, and polyisoprene moiety, R1 is hydrogen or an alkyl group with 1 to 10 carbon atoms, Ph is a phenyl group, a is 1 to 50, R2 is hydrogen or an alkyl group with 1 to 10 carbon atoms, and b is 1 to 50. The first block and the second block may be connected to each other randomly.

A block copolymer according to an exemplary embodiment of the present disclosure comprises a block represented by Chemical Formula BC comprising a first block represented by Chemical Formula 1 and a second block represented by Chemical Formula 2:

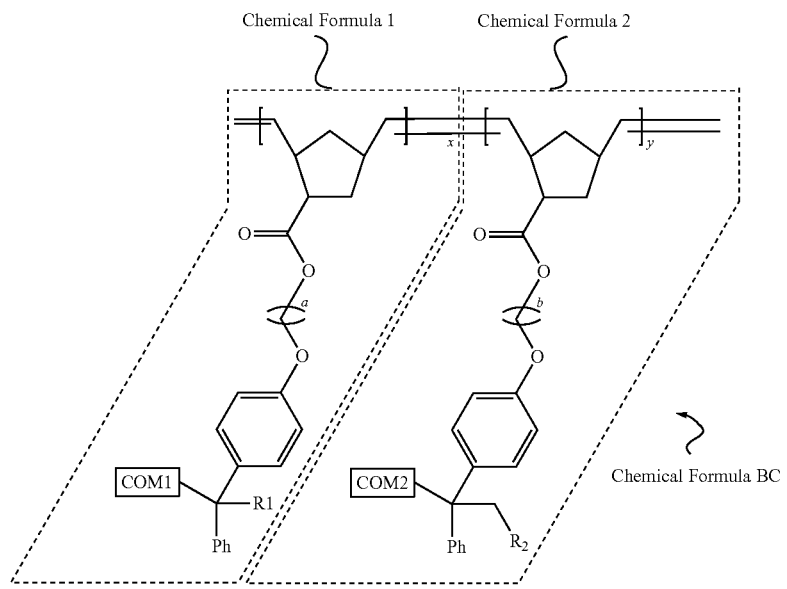

Here, COM1 and COM2 are independently selected from a polystyrene moiety, polymethylmethacrylate moiety, polyethylene oxide moiety, polyvinylpyridine moiety, polydimethylsiloxane moiety, polyferrocenyldimethylsilane moiety, and polyisoprene moiety, R1 is hydrogen or an alkyl group with 1 to 10 carbon atoms, Ph is a phenyl group, x is 10 to 500, a is 1 to 50, R2 is hydrogen or an alkyl group with 1 to 10 carbon atoms, y is 10 to 500, and b is 1 to 50.

As shown in Chemical Formula 1 and Chemical Formula 2, the block copolymer according to the present exemplary embodiment is a bottle-brush type block copolymer having a structure comprising a main chain and a side chain connected to the main chain. Accordingly, an entanglement phenomenon between polymers is minimized by the presence of the side chain such that a phase generation speed is increased and a spread of the main chain is generated. In this way, although a length of the main chain may be shorter as compared with a linear block copolymer, realization of the phase-separation having a large period (i.e., distance between the repetition of the physical structure) is possible by the spread of the main chain, and a shorter process time may be realized by the minimization of the entanglement phenomenon.

In a specific embodiment, COM1 in Chemical Formula 1 may comprise a group represented by Chemical Formula 3, and COM2 in Chemical Formula 2 may comprise a group represented by Chemical Formula 4.

Chemical Formula 3

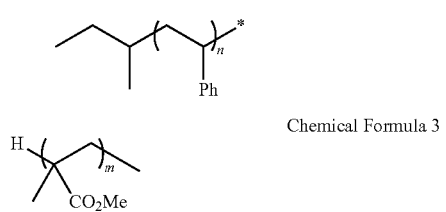

-continued

Chemical Formula 4

Here, n is 10 to 1000 and m is 10 to 1000. Ph means a phenyl group, Me means a methyl group, and * means a point of attachment.

The block copolymer according to the present exemplary embodiment may be represented by Chemical Formula 5.

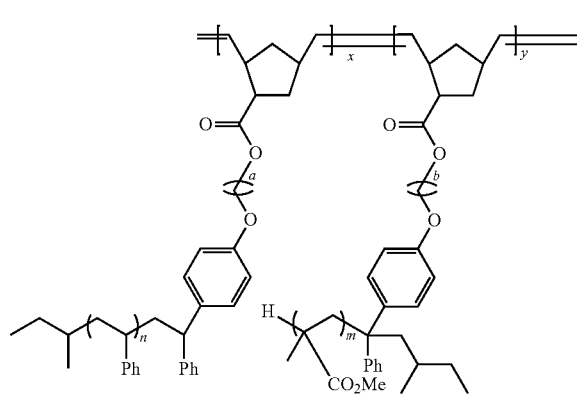

Chemical Formula 5

Here, n is 10 to 1000 and m is 10 to 1000. x is 10 to 500 and y is 10 to 500. Ph means a phenyl group and Me means a methyl group.

Next, a method of making a bottle-brush type block copolymer according to the present exemplary embodiment will be described.

The bottle-brush type of block copolymer according to an exemplary embodiment of the present disclosure can be made in the presence of a compound or material of Chemical Formula 6.

Chemical Formula 6

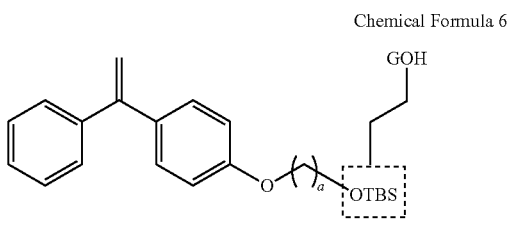

Here, a is 1 to 10, and OTBS is a tert-butyldimethylsilyloxy group. The initiator material according to the present exemplary embodiment includes an end having a functional group (GOH) such as —OTBS in Chemical Formula 6 such that a hydroxyl group may be generated or induced when synthesizing a macromer that will be described later.

The compound of Formula 6 according to the present exemplary embodiment may be synthesized based on Reaction Equation 1.

Reaction Equation 1

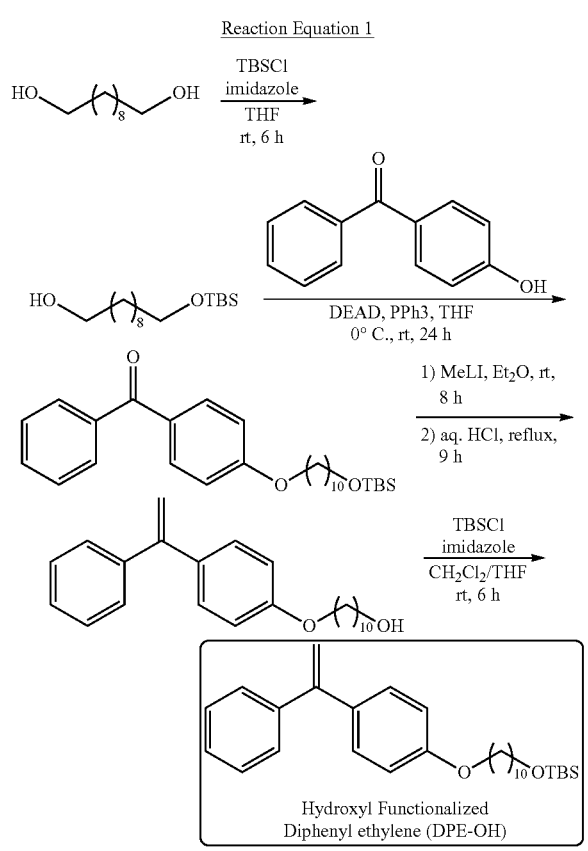

Here, TBSCl is tert-butyldimethylsilyl chloride, THF is tetrahydrofuran, OTBS is a tert-butyldimethylsilyloxy group, DEAD is diethyl azodicarboxylate, $PPh_3$ is triphenylphosphine, MeLI is methyllithium, and $Et_2O$ is diethyl ether.

The bottle-brush type block copolymer according to the present exemplary embodiment may be formed by polymerizing a first macromer represented by Chemical Formula 7 or Chemical Formula 7-1 and a second macromer represented by Chemical Formula 8 by a ROMP (ring opening metathesis polymerization) method.

Chemical Formula 7

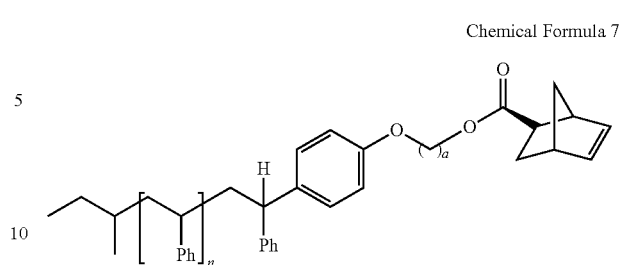

Chemical Formula 7-1

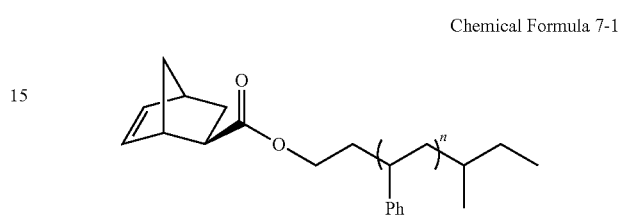

Chemical Formula 8

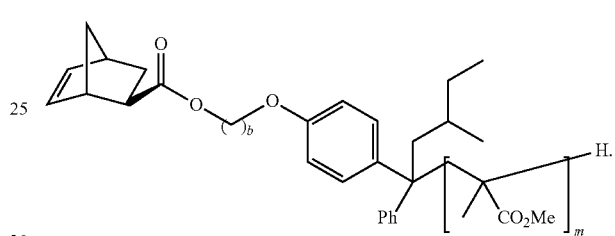

Here, a is 1 to 10, n is 10 to 1000, b is 1 to 10, and m is 10 to 1000. Ph is a phenyl group and Me is a methyl group. During the polymerization of the first macromer and the second macromer, a Grubbs catalyst may be used. The Grubbs catalyst used is preferably a third generation Grubbs catalyst as shown below.

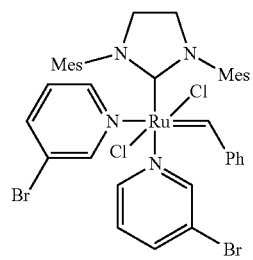

wherein Mes represents a mesitylene group, and Ph is a phenyl group.

The first macromer represented by Chemical Formula 7 and the second macromer according to the present exemplary embodiment may be synthesized based on Reaction Equation 2 and Reaction Equation 3 respectively. As shown in Reaction Equation 2 or Reaction Equation 3, in the preparation of the first macromer, a compound represented by Chemical Formula 6 is used in the second step, and in the preparation of the second macromer, a compound represented by Chemical Formula 6 is used in the first step. The compound of Formula 6 can be used to synthesize the first macromer or the second macromer via negative ion polymerization.

Reaction Equation 2

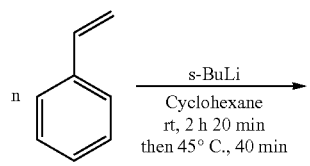
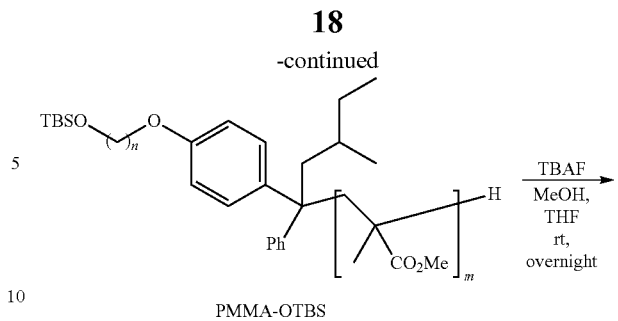
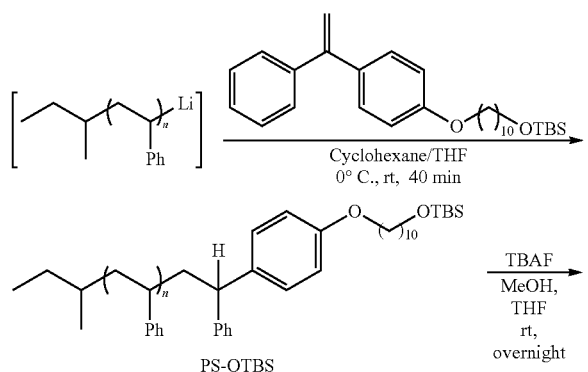
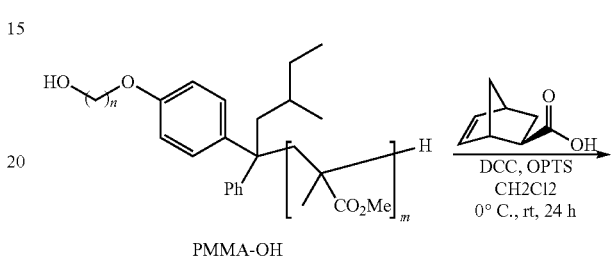
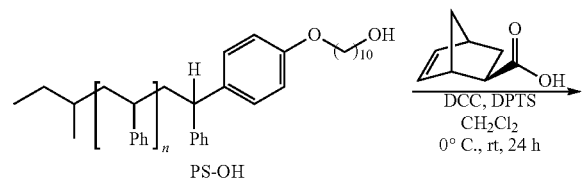
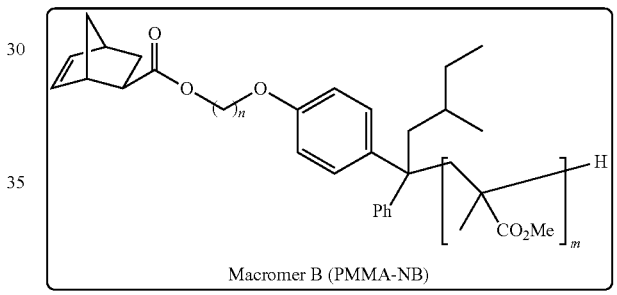
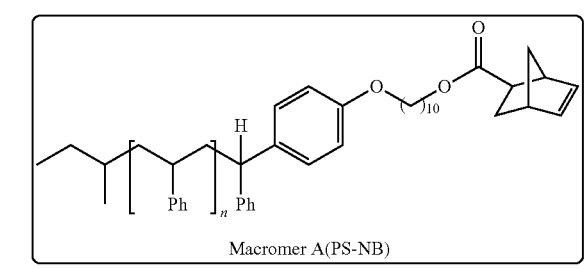

Here, THF is tetrahydrofuran, TBAF is tetrabutylammonium fluoride, MeOH is methanol, DCC is dicyclohexylcarbodiimide, DPTS is pyridinium p-toluenesulfonate, n is 10 to 1000, and Ph is a phenyl group.

Here, THF is tetrahydrofuran, TBAF is tetrabutylammonium fluoride, DCC is dicyclohexylcarbodiimide, DPTS is pyridinium p-toluenesulfonate, and m is 10 to 1000.

In other embodiment, the first macromer represented by Chemical Formula 7-1 may be a material synthesized based on Reaction Equation 4.

Reaction Equation 3

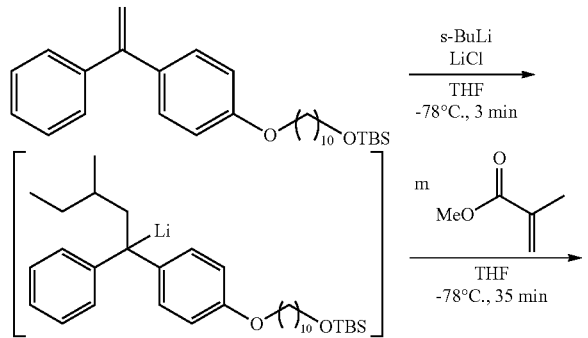

Reaction Equation 4

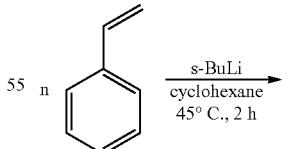
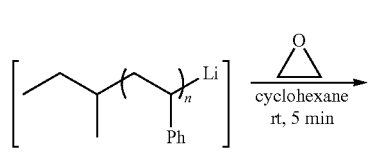

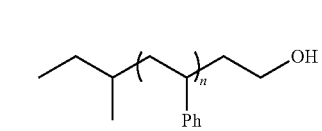
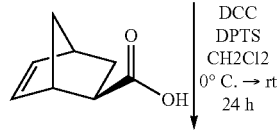
Here, s-BuLi is sec-butyllithium, DCC is dicyclohexylcarbodiimide, DPTS is pyridinium p-toluenesulfonate, Ph is a phenyl group, n is 10 to 1000, and m is 10 to 1000.
The bottle-brush type block copolymer according to the present exemplary embodiment may be synthesized based on Reaction Equation 5.
Reaction Equation 5
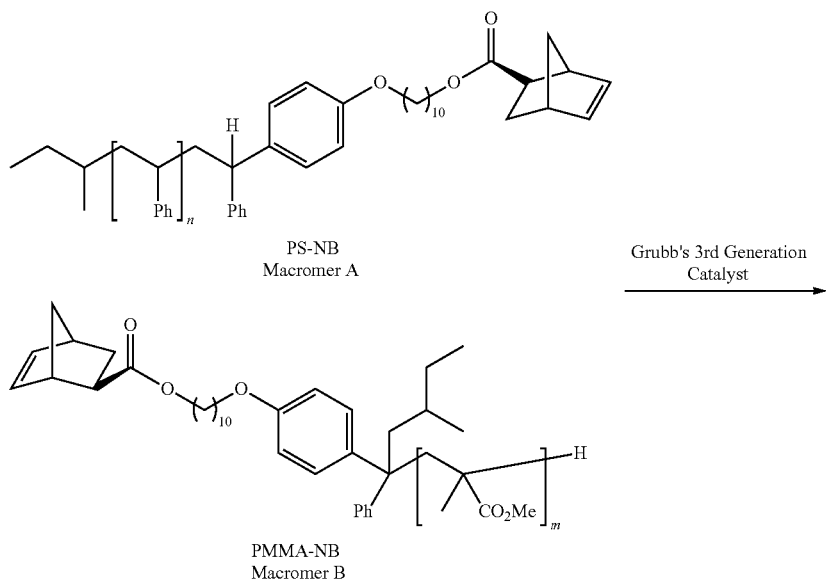
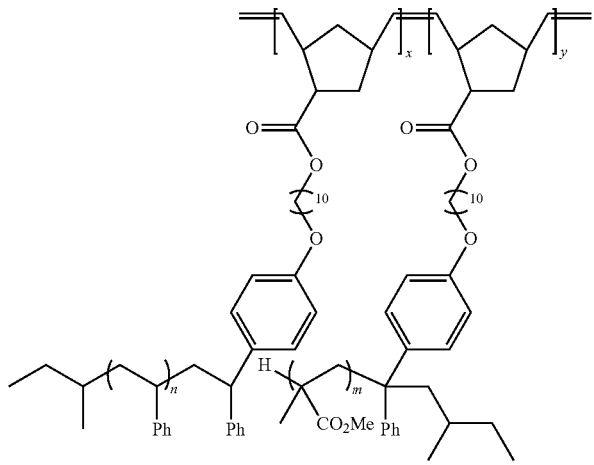
Bottle Brush Block Copolymer Here, Ph is a phenyl group, Me is methyl, x is 10 to 500, y is 10 to 500, n is 10 to 1000, and m is 10 to 1000.

Experimental Example 1

A neutralization layer is formed on a silicon substrate, and the bottle-brush type block copolymer comprising a first block represented by Formula 1 and a second block represented by Formula 2 is mixed with propylene glycol methyl ethyl acetate ("PGMEA") to prepare a solution containing 5 wt % of the block copolymer. The solution is coated on the neutralization layer. Next, solvent annealing is performed for 40 minutes at a temperature of 21° C. Next, a heat treatment (thermal annealing) is performed for 60 minutes at a temperature of 240° C.

Referring to FIG. 1, FIG. 1 is a vertical lamella structure of the block copolymer having random directivity. It may be confirmed that phase-separation of the block copolymer is achieved.

Experimental Example 2

After forming the neutralization layer as described in Experimental Example 1, guide patterns having a width of about 1.5 μm are formed, and the bottle-brush type of block copolymer comprising a first block represented by Formula 1 and a second block represented by Formula 2 is coated between the guide patterns. The rest of the process is performed the same as in Experimental Example 1.

Figure 2:
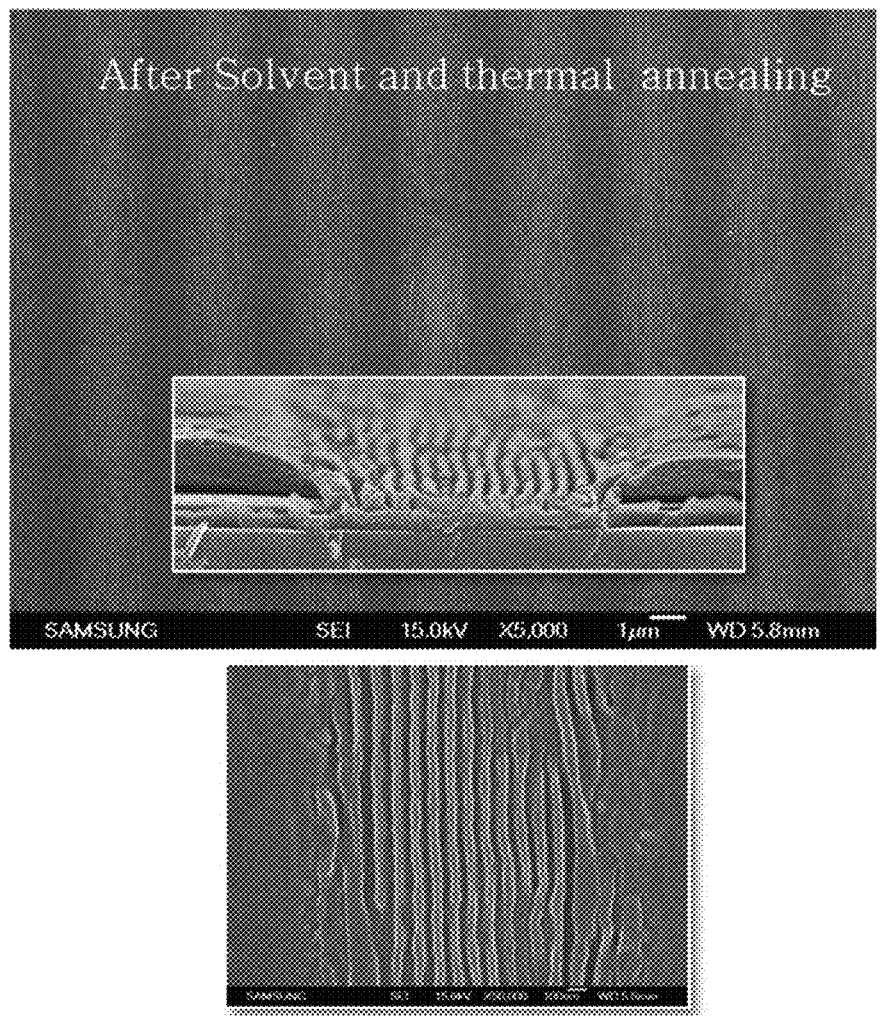

Referring to FIG. 2, FIG. 2 is a vertical lamella structure of a nanoline shape aligned between a guided pattern. It may be confirmed that the phase-separation of the block copolymer is generated thereby forming a linear pattern well.

Next, a block copolymer according to another exemplary embodiment will be described, in particular a linear block copolymer embodiment is described.

The linear block copolymer according to an exemplary embodiment of the present disclosure includes a first block represented by COM A in Structural Formula A, a second block represented by COM B in Structural Formula A, and a random block inserted between the first block and the second block and represented by RBC in Structural Formula A.

Structural Formula A

Here, COM A and COM B are independently selected from a polystyrene moiety, polymethylmethacrylate moiety, polyethylene oxide moiety, polyvinylpyridine moiety, polydimethylsiloxane moiety, polyferrocenyldimethylsilane moiety, and polyisoprene moiety, and RBC is a group in which at least two unit blocks are randomly copolymerized.

It is preferable that COM A is a group comprising a polystyrene moiety, and COM B is a group comprising a polymethylmethacrylate moiety in Structural Formula A.

Figure 3:
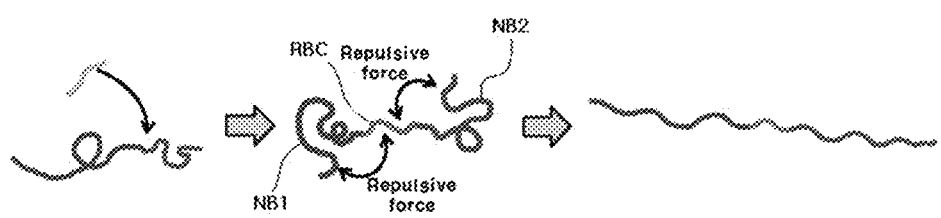
FIG. 3 is a schematic diagram of an exemplary block copolymer of Structural Formula A.

FIG. 3 is schematic diagram of a block copolymer according to an exemplary embodiment of the present disclosure.

Referring to FIG. 3, the block copolymer according to the present exemplary embodiment is a linear block copolymer in which a random block RBC is inserted between a first block NB1 and a second block NB2. The random block RBC has an effect of spreading the tangled chain. Without being bound by theory, in particular, the reason that the phase-separation is generated in the copolymer comprising the linked first block and the second block is based on a repulsive force between the first block and the second block. Accordingly, in the random block RBC, a monomer forming the first block and a monomer forming the second block are randomly mixed such that the repulsing monomers tend to spread and to not be mixed with each other in the random block RBC. Also, the first block and the second block tend to spread and to not be mixed with the random block RBC. Accordingly, the period may be increased in the phase-separation pattern of the block copolymer and the fast phase-separation may be realized.

Figure 4:
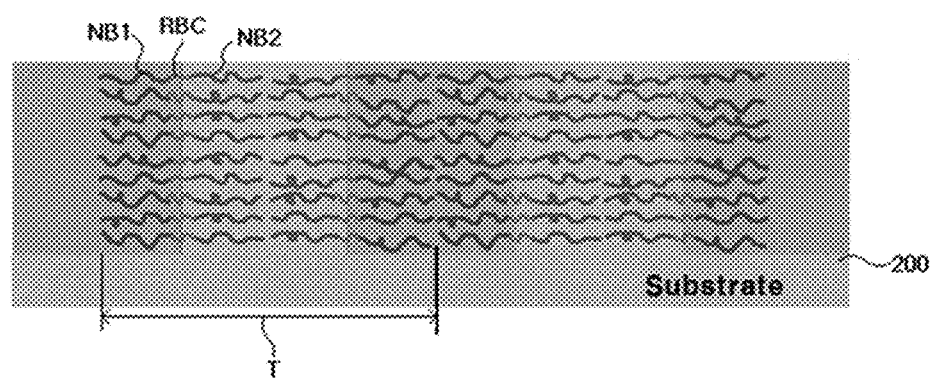
FIG. 4 is a cross-sectional view of a hardening state of the block copolymer of FIG. 3 after coating the block copolymer on a substrate.

FIG. 4 is a cross-sectional view of a hardening state of the block copolymer of FIG. 3 after coating the block copolymer on a substrate.

Referring to FIG. 4, if the block copolymer according to an exemplary embodiment of the present disclosure is hardened by the heat treatment, the phase-separation is performed such that a structure having an average period T of less than about 100 nm is formed.

The linear block copolymer according to the present exemplary embodiment may be a block copolymer represented by Chemical Formula B.

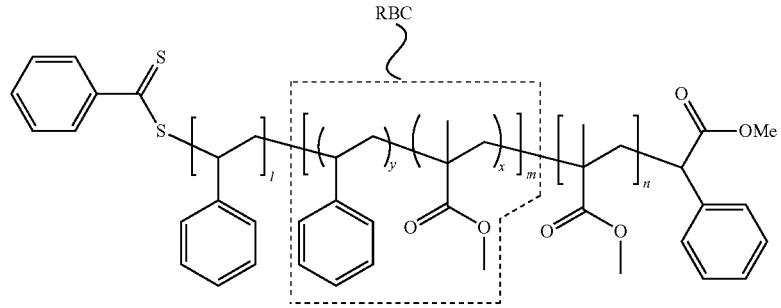

Chemical Formula B

Here, a molecular weight of Chemical Formula B is 10,000 to 1,000,000, l and n are 10 to 10,000, m is 5 to 2000, x is 10 to 500, y is 10 to 500, and a unit block represented by

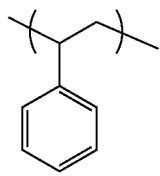

and a unit block represented by

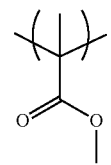

in RBC are randomly copolymerized.

Next, a method of making the linear block copolymer including the random block according to the present exemplary embodiment will be described.

The linear block copolymer according to an exemplary embodiment of the present disclosure is synthesized by Reaction Equation A.

Reaction Equation A

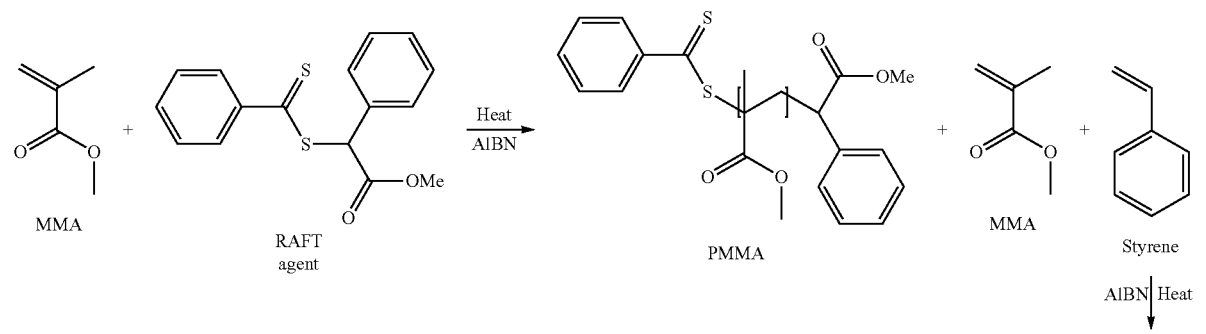

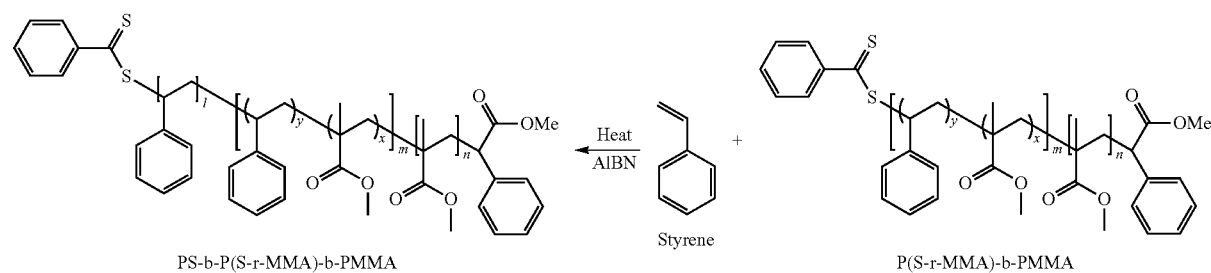

Here, AIBN is 2,2'-azobis(2-methylpropionitrile), and RAFT is reversible addition-fragmentation chain transfer polymerization.

Experimental Example 3

Figure 5:
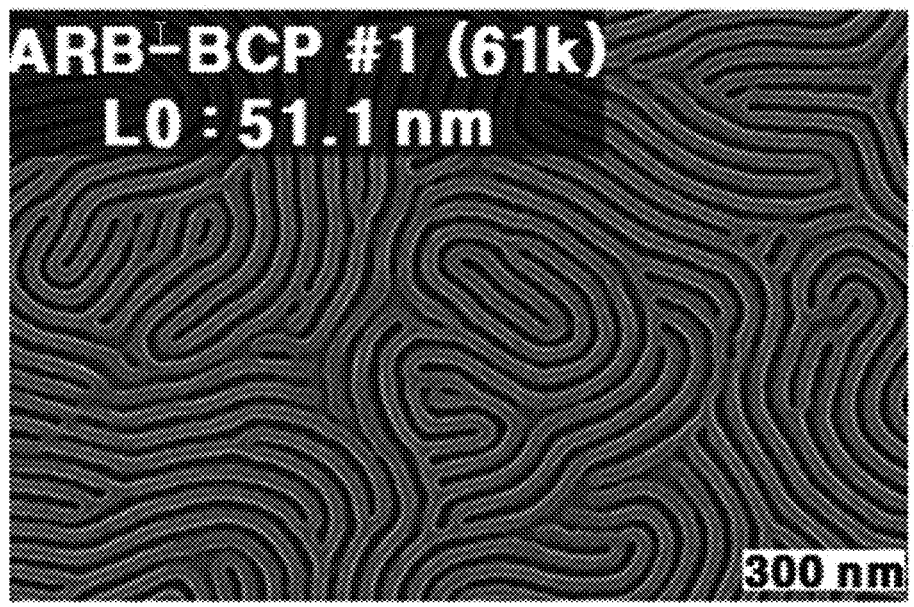
FIG. 5 and FIG. 6 are photos showing a phase-separation phenomenon of a vertical lamella structure of a block copolymer of Structural Formula A.

FIG. 5 shows a vertical lamella structure having random directivity.

A neutralization layer is formed on a silicon substrate, and three samples of the block copolymer, of which a volume fraction of the random block is respectively 8%, 12%, and 15% in the three samples is mixed with the PGMEA and is coated on the neutralization layer. Next, thermal annealing is performed for 12 hours at a temperature of 250° C. As a result, compared with the linear block copolymer without the random block, the period (i.e., distance between the repetition of the physical structure) is respectively increased by 28%, 67%, and 70%.

FIG. 5 shows a phase-separation phenomenon in which the linear block copolymer of which the volume fraction of the random block is 8% is thermal-treated, and it may be confirmed that the phase-separation of the block copolymer is generated well.

Experimental Example 4

After forming the neutralization layer as described in Experimental Example 3, guide patterns having a width of about 0.8 μm are formed and the linear block copolymer is coated between the guide patterns. The rest of the process is performed the same as in Experimental Example 3.

Figure 6:
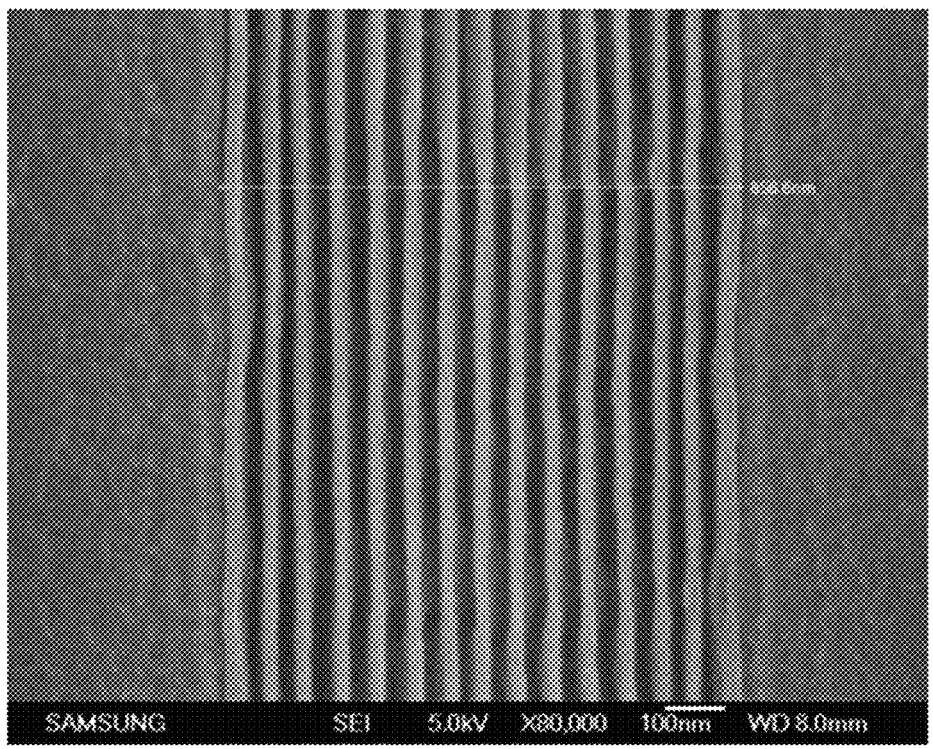

Referring to FIG. 6, FIG. 6 shows a vertical lamella structure of a nanoline shape aligned in a guide pattern. It may be confirmed that the phase-separation of the block copolymer is realized such that the linear pattern is formed well.

Next, a pattern formation method using the described bottle-brush type block copolymer or the described linear block copolymer including the random block will be described.

FIG. 7 to FIG. 10 are cross-sectional views of a coated substrate illustrating an exemplary pattern formation method.

Figure 7:
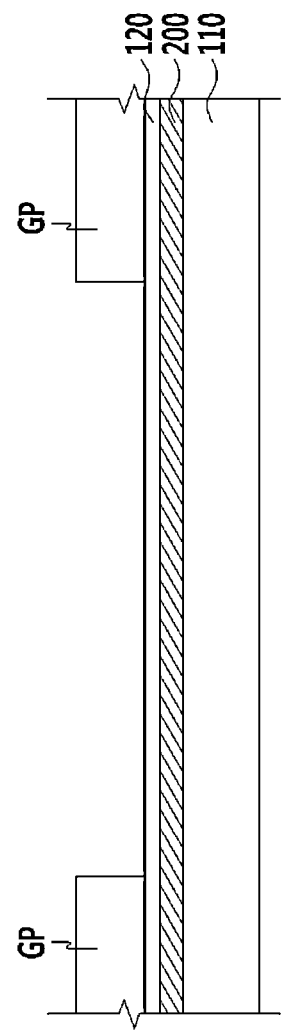
FIG. 7 to FIG. 10 are cross-sectional views of a coated substrate illustrating an exemplary pattern formation method.

Referring to FIG. 7, a mother pattern layer 200 comprising a material for forming a pattern is formed on a substrate 110. A neutralization layer 120 is formed on the mother pattern layer 200. The substrate 110 can be a glass substrate or a silicon substrate. The neutralization layer 120 is a layer that does not have hydrophilicity or hydrophobicity, is chemically neutral (i.e. has a neutral charge), and includes a self-assembled monolayer (SAM), a polymer brush, and a MAT (cross-linked random copolymer mat) or an organic monolayer including the MAT.

Although not illustrated, before the mother pattern layer 200 is formed, the surface of the substrate 110 may be pre-treated using an acid solution such as hydrofluoric acid (HF).

Next, a guide pattern GP is formed on the neutralization layer 120. The guide pattern GP may be formed through a photolithography process using a photoresist material. The guide pattern GP may be formed by first forming a photoresist layer on the neutralization layer 120 and then radiating light-using a mask to develop the photoresist layer. The guide pattern GP can be formed by a process not limited to a photolithography process, and may be formed by another method such as a nanoimprint process.

The guide pattern GP controls the directivity of a block copolymer to be subsequently formed. The distance between the guide patterns GP may be about 1.5 μm or less. However, when the guide pattern GP is formed by the photolithography process, the distance may be 1.5 μm or more in consideration of a limitation of resolution of photo equipment.

Figure 8:
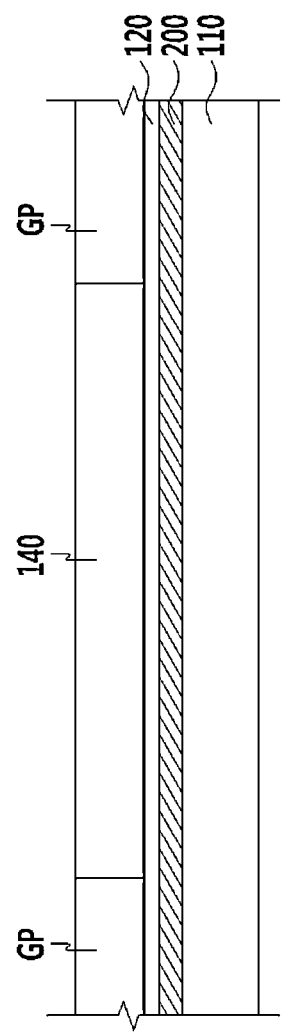

Referring to FIG. 8, a polymer thin film 140 is formed by coating the described bottle-brush type block copolymer or the described linear block copolymer including the random block between the guide patterns GP by a spin coating method and the like. The polymer thin film 140 is a polymer where two different kinds of monomers are covalent-bonded. The two different kinds of monomers have different physical and chemical properties. Accordingly, the first monomer has relative hydrophilicity compared to the second monomer, and the second monomer has relative hydrophobicity compared to the first monomer.

Figure 9:
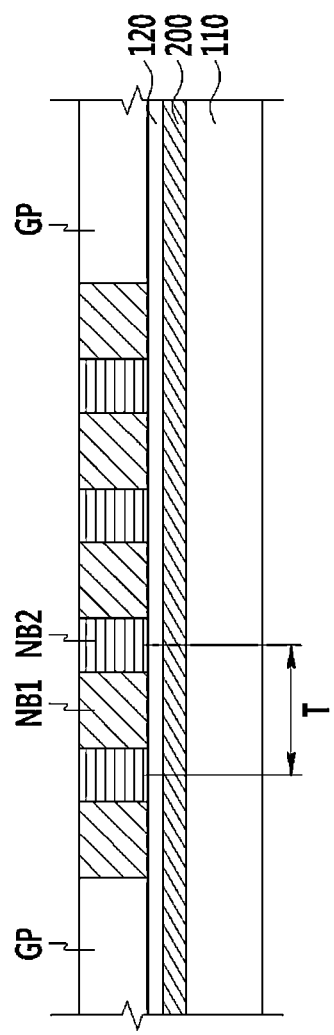

Referring to FIG. 9, the substrate 110 including the polymer thin film 140 is heat treated. The heat treatment process may be performed at about 200° C. to about 300° C. under a $N_2$ or vacuum condition for about 2 hours or more. Ultraviolet ray treatment may be performed instead of the heat treatment. After the heat treatment, the polymer thin film 140 is phase-separated into the first block NB1 and the second block NB2.

The first block NB1 may be linearly formed, and the second block NB2, which is phase-separated from the first block NB1, is disposed adjacent to the first block NB1. In an exemplary embodiment of the present disclosure, the first block NB1 may include a polystyrene moiety ("PS") and the second block NB2 may include poly(methyl methacrylate) moiety ("PMMA").

In the present exemplary embodiment, a period T of a unit at which the first block NB1 and the second block NB2 are repeated may be about 100 nm or less.

Figure 10:
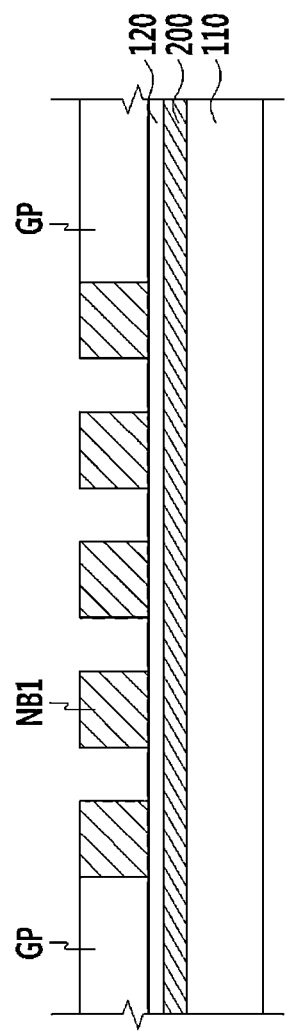

Referring to FIG. 10, the second block NB2 is removed. Accordingly, the guide pattern GP remains on the neutralization layer 120.

The second block NB2 may be removed through wet etching. For example, if the substrate 110 including the first block NB1 and the second block NB2 is immersed in a solution including acetic acid and then subjected to sonication, only the second block NB2 is selectively removed. Unlike this, the second block NB2 may be removed through dry etching. For example, after ultraviolet rays are radiated on the first block NB1 and the second block NB2, only the second block NB2 may be selectively removed through reactive ion etching (RIE) by a difference in etching selectivity.

Next, by using the first block NB1 as a mask, the neutralization layer 120 and the mother pattern layer 200 are etched to pattern the mother pattern layer 200.

Next, the first block NB1 and guide pattern GP are removed. For example, the substrate 110 including the first block NB1 and guide pattern GP may be immersed in a solution including toluene or the like and then subjected to sonication to remove the first block NB1 and guide pattern GP.

Figure 11:
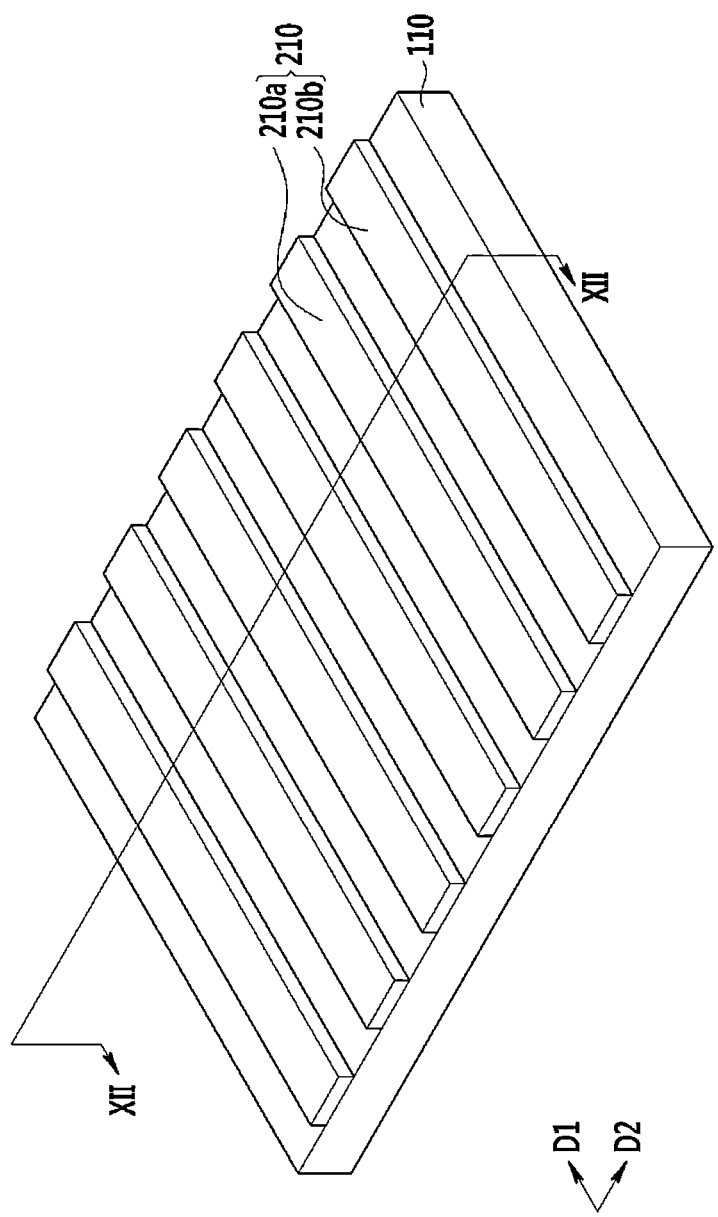
FIG. 11 is a perspective view of a pattern formed by the pattern formation method illustrated in FIG. 7 to FIG. 10.

FIG. 11 is a perspective view of a pattern formed by the pattern formation method described in FIG. 7 to FIG. 10, and FIG. 12 is a cross-sectional view taken along the line XII-XII of FIG. 11.

Figure 12:
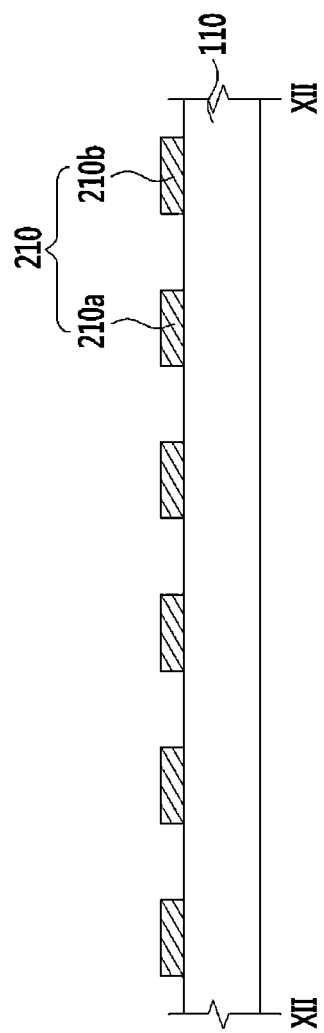
FIG. 12 is a cross-sectional view of the pattern of FIG. 11 taken along the line XII-XII.

The pattern illustrated in FIG. 11 and FIG. 12 may be a metal pattern constituting a polarizer. Referring to FIG. 11 and FIG. 12, the mother pattern layer 200 is patterned to form a linear lattice pattern 210 including a first line 210a and a second line 210b on the substrate 110.

The first and second lines 210a and 210b extend in the first direction D1 of the substrate 110. The second line 210b may be disposed in the second direction D2 that is different from the first direction D1 of the first line 210a. The first and second lines 210a and 210b may include aluminum, silver, platinum, or the like.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A block copolymer comprising:
a first block represented by Chemical Formula 1; and
a second block represented by Chemical Formula 2:

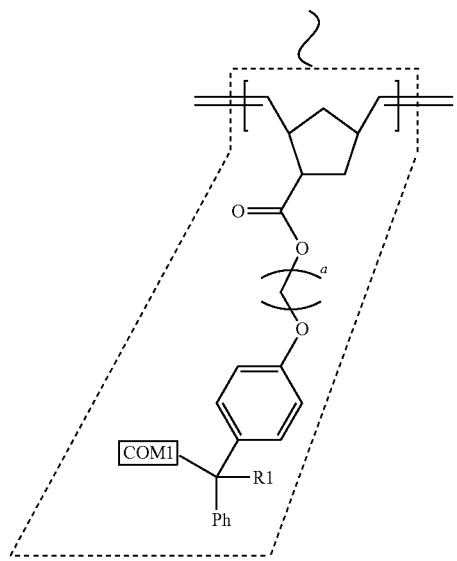

Chemical Formula 1

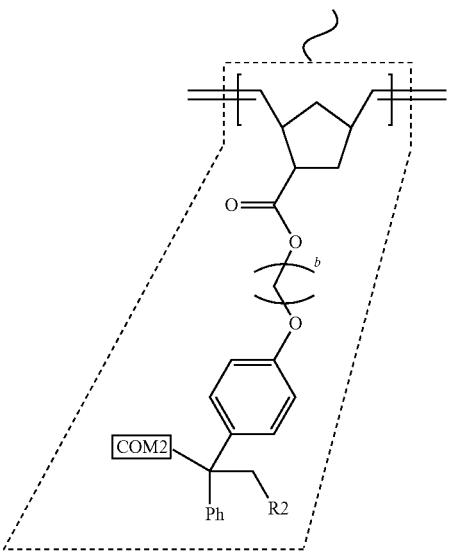

Chemical Formula 2 wherein COM1 and COM2 are independently selected from a polystyrene moiety, polymethylmethacrylate moiety, polyethylene oxide moiety, polyvinylpyridine moiety, polydimethylsiloxane moiety, polyferrocenyldimethylsilane moiety, and polyisoprene moiety, R1 is hydrogen or an alkyl group with 1 to 10 carbon atoms, Ph is a phenyl group, a is 1 to 50, R2 is hydrogen or an alkyl group with 1 to 10 carbon atoms, and b is 1 to 50.

2. The block copolymer of claim 1, wherein the block copolymer comprises a block represented by Chemical Formula BC comprising a first block represented by Chemical Formula 1 and a second block represented by Chemical Formula 2:

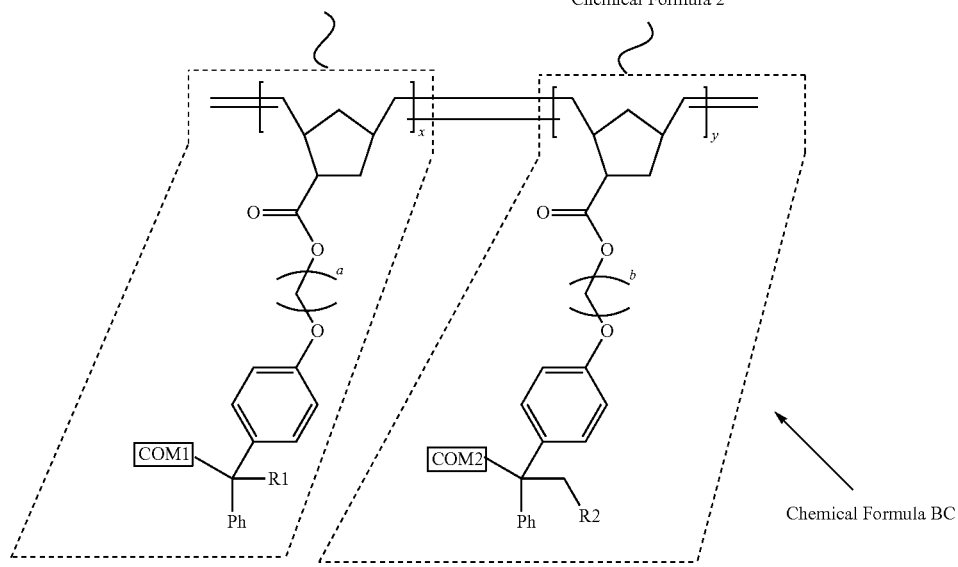

Chemical Formula BC wherein COM1 and COM2 are independently selected from a polystyrene moiety, polymethylmethacrylate moiety, polyethylene oxide moiety, polyvinylpyridine moiety, polydimethylsiloxane moiety, polyferrocenyldimethylsilane moiety, and polyisoprene moiety, R1 is hydrogen or an alkyl group with 1 to 10 carbon atoms, Ph is a phenyl group, x is 10 to 500, a is 1 to 50, R2 is hydrogen or an alkyl group with 1 to 10 carbon atoms, y is 10 to 500, and b is 1 to 50.

3. The block copolymer of claim 2, wherein in Chemical Formula 1, COM1 comprises a group represented by Chemical Formula 3, and in Chemical Formula 2, COM2 comprises a group represented by Chemical Formula 4:

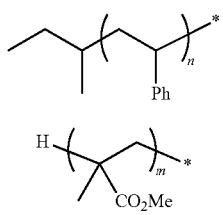

Chemical Formula 3

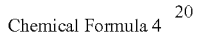

Chemical Formula 4 wherein Ph is a phenyl group and Me is methyl, n is 10 to 1000, m is 10 to 1000, and * means a point of attachment.

4. The block copolymer of claim 2, wherein the block copolymer is represented by Chemical Formula 5:

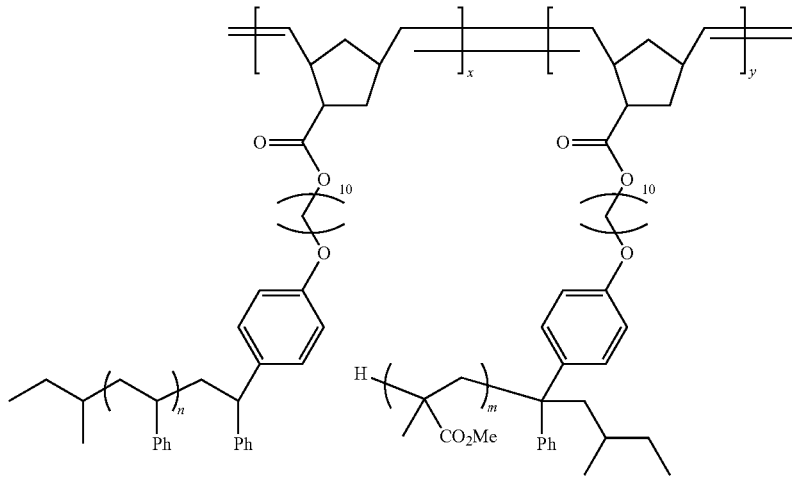

Chemical Formula 5 wherein Ph is a phenyl group, Me is methyl, x is 10 to 500, y is 10 to 500, n is 10 to 1000 and m is 10 to 1000.

5. The block copolymer of claim 1, wherein the first block and the second block is connected to each other randomly.

6. A method of making a block copolymer, comprising:

synthesizing the block copolymer of claim 2 in the presence of a compound of Chemical Formula 6:

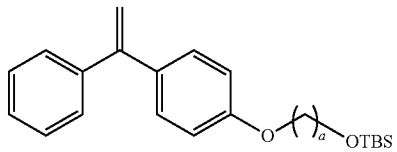

Chemical Formula 6 wherein OTBS is a tert-butyldimethylsilyloxy group, and a is 1 to 10.

7. The method of claim 6, wherein the material of Chemical Formula 6 is synthesized based on Reaction Equation 1:

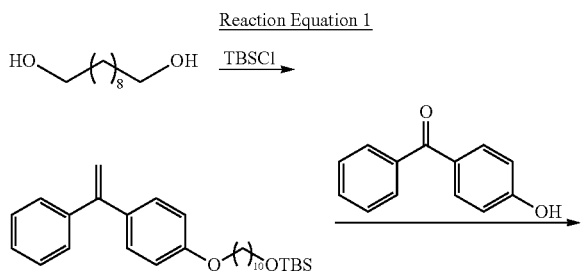

Reaction Equation 1

-continued

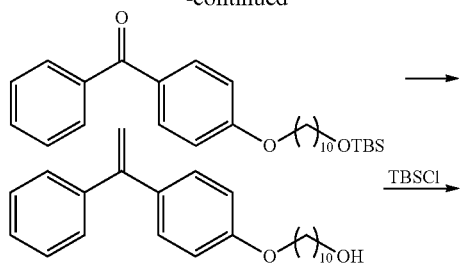

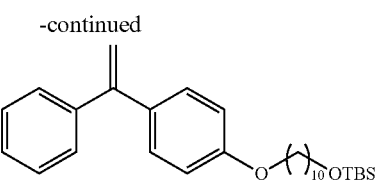

wherein TBSCl is tert-butyldimethylsilyl chloride, and OTBS is tert-butyldimethylsilyloxy group.

8. The method of claim 5, wherein the block copolymer is made by polymerizing a first macromer represented by Chemical Formula 7 or Chemical Formula 7-1 and a second macromer represented by Chemical Formula 8 by a ring opening metathesis polymerization method:

Chemical Formula 7

Chemical Formula 7-1

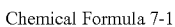

Chemical Formula 8

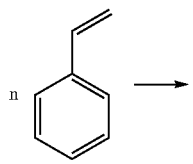

wherein Ph is a phenyl group, Me is methyl, a is 1 to 10, n is 10 to 1000, b is 1 to 10, and m is 10 to 1000.

9. The method of claim 8, wherein the first macromer represented by Chemical Formula 7 is synthesized based on Reaction Equation 2:

Reaction Equation 2

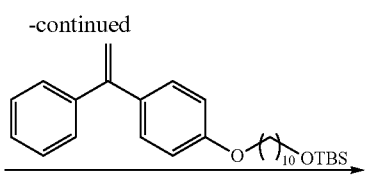

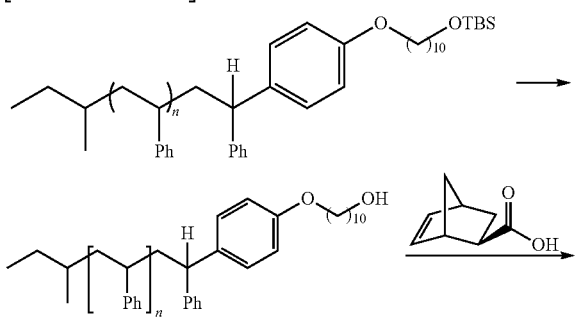

wherein OTBS is a tert-butyldimethylsilyl oxy group, Ph is phenyl, and n is 10 to 1000.

10. The method of claim 8, wherein the second macromer is synthesized based on Reaction Equation 3:

Reaction Equation 3

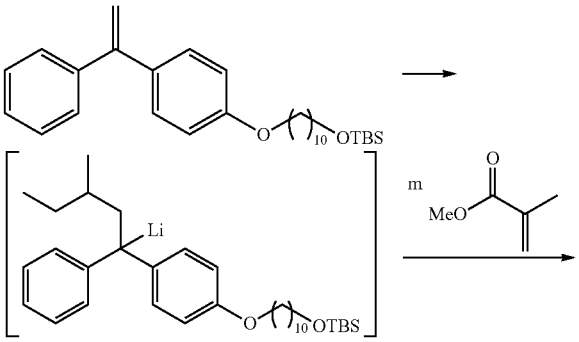

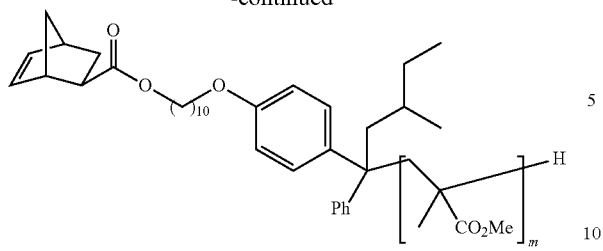

wherein Ph is phenyl, Me is methyl, OTBS is tert-butyldimethylsilyl oxy group, and m is 10 to 1000.

11. The method of claim 8, wherein a Grubbs catalyst is present during the polymerization of the first macromer and the second macromer.

12. The method of claim 8, wherein the first macromer represented by Chemical Formula 7-1 is synthesized based on Reaction Equation 4:

Reaction Equation 4

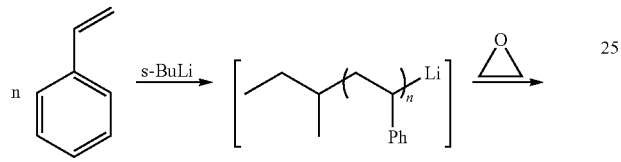

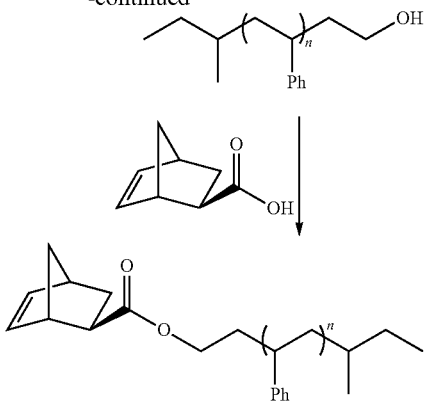

wherein Ph is phenyl, and n is 10 to 1000.

13. A pattern formation method comprising:
coating the block copolymer of claim 2 on a substrate comprising a mother pattern layer to form a polymer thin film;
selectively removing one block of a first block and a second block from the polymer thin film; and
etching the mother pattern layer by using the polymer thin film from which one block is removed as a mask.

14. The pattern formation method of claim 13, wherein the polymer thin film is treated with ultraviolet rays or heat.

* * * * *